United States Patent
Bengtsson et al.

(10) Patent No.: US 9,967,015 B2
(45) Date of Patent: May 8, 2018

(54) SYSTEMS, METHODS AND COMPUTER PROGRAM PRODUCTS FOR OPTIMIZING A WIRELESS CHANNEL BETWEEN A USER EQUIPMENT AND A BASE STATION

(71) Applicant: Sony Corporation, Tokyo (JP)

(72) Inventors: Erik Bengtsson, Eslöv (SE); Ove Edfors, Lund (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 63 days.

(21) Appl. No.: 14/700,765

(22) Filed: Apr. 30, 2015

(65) Prior Publication Data
US 2016/0294461 A1    Oct. 6, 2016

Related U.S. Application Data

(63) Continuation of application No. PCT/EP2015/056879, filed on Mar. 30, 2015.

(51) Int. Cl.
*H04W 4/00* (2009.01)
*H04B 7/06* (2006.01)
*H04B 17/12* (2015.01)

(52) U.S. Cl.
CPC ......... *H04B 7/0626* (2013.01); *H04B 7/0684* (2013.01); *H04B 17/12* (2015.01)

(58) Field of Classification Search
None
See application file for complete search history.

(56) References Cited

U.S. PATENT DOCUMENTS

2004/0179627 A1* 9/2004 Ketchum ............. H04B 7/0421
 375/267
2006/0274679 A1* 12/2006 Khandekar ........... H04L 5/0026
 370/278

(Continued)

FOREIGN PATENT DOCUMENTS

EP    2154802 A1    2/2010

OTHER PUBLICATIONS

CATT: "Uplink Non-codebook-based Precoding", 3GPP Draft; R1-083629, 3rd Generation Partnership Project (3GPP), Mobile Competence Centre ; 650, Route Des Lucioles ; F-06921 Sophia-Antipolis Cedex ; France, no. Prague, Czech Republic; Sep. 24, 2008, Sep. 24, 2008, XP050316987, [retrieved on Sep. 24, 2008].

(Continued)

*Primary Examiner* — Anh-Vu Ly
(74) *Attorney, Agent, or Firm* — James C. Edwards; Moore & Van Allen PLLC (57) ABSTRACT

The invention is directed to systems, methods and computer program products for optimizing a wireless channel between a user equipment ("UE") and a base station ("BS"). An exemplary method comprises instructing the UE to transmit a first pilot signal from a first antenna of the UE and a second pilot signal from a second antenna of the UE; estimating a first wireless channel for the first antenna and a second wireless channel for the second antenna; defining a first parameter of a first filter for the first wireless channel and a second parameter of a second filter for the second wireless channel; and transmitting the first parameter and the second parameter to the UE.

17 Claims, 4 Drawing Sheets

(56) References Cited

U.S. PATENT DOCUMENTS

| | | | |
|---|---|---|---|
| 2007/0053282 A1* | 3/2007 | Tong | H04B 7/04 370/208 |
| 2008/0125109 A1* | 5/2008 | Larsson | H04L 25/03343 455/424 |
| 2009/0186590 A1 | 7/2009 | Gale | |
| 2009/0196203 A1* | 8/2009 | Taira | H04B 7/0617 370/280 |
| 2009/0213949 A1* | 8/2009 | Javaudin | H04L 5/0048 375/260 |
| 2010/0309051 A1* | 12/2010 | Moshfeghi | G01S 5/0236 342/378 |
| 2015/0016394 A1* | 1/2015 | Ma | H04B 7/0452 370/329 |
| 2016/0142094 A1* | 5/2016 | Papadopoulos | H04B 17/14 375/219 |
| 2016/0183257 A1* | 6/2016 | Vrzic | H04W 74/004 370/329 |

OTHER PUBLICATIONS

International Search Report and Written Opinion; dated Dec. 16, 2015; issued in International Patent Application No. PCT/EP2015/056879.

\* cited by examiner

SYSTEMS, METHODS AND COMPUTER PROGRAM PRODUCTS FOR OPTIMIZING A WIRELESS CHANNEL BETWEEN A USER EQUIPMENT AND A BASE STATION

BACKGROUND

Antenna diversity refers to using two or more antennas to improve the quality of a wireless link between a base station ("BS") and user equipment ("UE"). When the order (i.e., number of antennas) of a multiple input multiple output ("MIMO") system increases, it may not be as straightforward to select which antenna to use among multiple antennas for optimizing a wireless link or connection between a UE and a BS. The present invention is directed to enabling such a selection.

BRIEF SUMMARY

Embodiments of the invention are directed to systems, methods and computer program products for optimizing a wireless channel between a user equipment and a base station. A method for optimizing a wireless channel between a user equipment and a base station comprises instructing the UE to transmit a first pilot signal from a first antenna of the UE and a second pilot signal from a second antenna of the UE; estimating a first wireless channel for the first antenna and a second wireless channel for the second antenna; defining a first parameter of a first filter for the first wireless channel and a second parameter of a second filter for the second wireless channel; and transmitting the first parameter and the second parameter to the UE.

In some embodiments, the first parameter or the second parameter comprises at least one of an amplitude balance or a phase offset associated with the first antenna and the second antenna.

In some embodiments, the first wireless channel or the second wireless channel is estimated at a predetermined rate.

In some embodiments, an output signal at the first antenna or the second antenna is based on an amplitude balance and a phase offset associated with the first antenna and the second antenna.

In some embodiments, the first wireless channel or the second wireless channel is used for both uplink ("UL") or downlink ("DL") transmission.

In some embodiments, a first angle of arrival ("AoA") for multipath components of the first pilot signal is substantially equal to a second AoA for multipath components of the second pilot signal.

In some embodiments, the BS shares channel state information ("CSI") associated with at least one of the first wireless channel or the second wireless channel with the UE such that the UE probes at least one of the first antenna or the second antenna at a time chosen by the UE.

In some embodiments, an apparatus is provided for optimizing a wireless channel between a user equipment and a base station. The apparatus comprises a memory; a processor; and a module stored in the memory, executable by the processor, and configured for instructing the UE to transmit a first pilot signal from a first antenna of the UE and a second pilot signal from a second antenna of the UE; estimating a first wireless channel for the first antenna and a second wireless channel for the second antenna; defining a first parameter of a first filter for the first wireless channel and a second parameter of a second filter for the second wireless channel; and transmitting the first parameter and the second parameter to the UE. In some embodiments, the UE uses at least one of the first CSI or the second CSI to probe at least one of the first antenna or the second antenna at a time chosen by the UE.

In some embodiments, a computer program product is provided for optimizing a wireless channel between a user equipment and a base station. The computer program product comprises a non-transitory computer-readable medium comprising a set of codes for causing a computer to perform instructing the UE to transmit a first pilot signal from a first antenna of the UE and a second pilot signal from a second antenna of the UE; estimating a first wireless channel for the first antenna and a second wireless channel for the second antenna; defining a first parameter of a first filter for the first wireless channel and a second parameter of a second filter for the second wireless channel; and transmitting the first parameter and the second parameter to the UE.

In some embodiments, a method is provided for optimizing a wireless channel between a user equipment and a base station. The method comprises instructing the UE to transmit a first pilot signal from a first antenna of the UE and a second pilot signal from a second antenna of the UE; and transmitting, to the UE, first channel state information for a first wireless channel associated with the first antenna and second CSI information for a second wireless channel associated with the second antenna, wherein the UE uses the first CSI to estimate the first wireless channel and the second CSI to estimate the second wireless channel. Apparatuses and computer program products may be provided for executing this method and any other method described herein. In some embodiments, the UE uses at least one of the first CSI or the second CSI to determine at least one of the amplitude balance or the phase offset associated with the first antenna and the second antenna.

In some embodiments, the UE uses at least one of the first CSI or the second CSI to probe at least one of the first antenna or the second antenna at a time chosen by the UE.

BRIEF DESCRIPTION OF THE DRAWINGS

Having thus described embodiments of the invention in general terms, reference will now be made to the accompanying drawings, where:

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Massive MIMO systems are a popular candidate for future 3GPP ($3^{rd}$ Generation Partnership Project) releases. "Massive" MIMO refers to using multiple antennas (e.g., equal to or greater than a threshold number of antennas) in a MIMO system. An order associated with a MIMO system refers to a number of antennas associated with the MIMO system. The MIMO system includes at least one user equipment ("UE") and at least one base station ("BS"). There is massive research in the area of MIMO systems but UE antenna behavior is overlooked.

Recently, live testing of MuMIMO ("multi-user MIMO") systems has performed worse than expectations. It has been seen that there is larger than expected correlation from the radio channels (also referred to as a wireless link from UEs) to different base stations. This can be explained by the notion that user interaction with the antenna is a dominant contributor to the performance of the antenna. One way to improve the performance is through diversity. Antenna diversity refers to using two or more antennas to improve the quality of a wireless link between the BS and a UE. The present invention is directed to a UE with two or more antennas.

The present invention is not just directed to selecting an antenna at the UE, but also weighting the amount of energy transmitted or received by each UE antenna in order to optimize the transmission channel between the UE and the BS. The present invention weights the amount of energy for each antenna and optimizes the phase for each antenna for optimized channel utilization. The present invention is directed to optimizing a wireless channel between a UE and a BS by weighting the power levels of antennas on the UE. The present invention improves antenna diversity performance and enables open loop optimization by the UE. An open loop is where one or more feedback loops are not present between the output (e.g., the BS or UE) and input (e.g., the UE or BS) of the system.

The present invention is directed to using the same pilot signal or different pilot signals transmitted from multiple antennas of the UE. Both uplink ("UL") and downlink ("DL") channels are determined by pilot signals that need to be transmitted at the beginning of a data frame. The present invention relates to transmitting the same pilot signal from two or more antennas substantially simultaneously. Then, the BS will interpret the two or more antennas as a single antenna and the combined characteristics of the antennas determines the performance of the UE. The present invention enables the UE to change or optimize the power level of each antenna (power ratio) and the relative phase (delay) prior to transmission of the pilot signal.

In some embodiments, a UE transmits the pilot signal from a single antenna, and in such a scenario, the UE increases the power level for that antenna, and decreases the power levels of other antennas. The BS directs energy distribution among the antennas based on the pilot signal. If there is no pilot signal transmitted from an antenna, that antenna will not receive any signal nor will the BS listen to that antenna. Transmitting individual pilot signals for the different antennas will take system resources as the pilots are a limited resource. By sending the same pilot signal from multiple antennas of the UE, optimized use of the channel between the UE and the BS is possible if information about the power split between antennas and phase offset of the antennas is available.

The present invention also makes it possible for the UE to send the same pilot signal from different antennas with different power levels and/or different phases. In such a scenario, the same power and phase ratio needs to be applied to the different antennas during both UL and DL modes. The power and phase ratios are already known by the UE when combining signals from both antennas in the UE.

In some embodiments, the UE applies the weighting factor to the antennas with involvement from the BS. In other embodiments, the UE applies the weighting factor to the antennas without any involvement from the BS. For example, the UE can direct some power to a first antenna and a second antenna and evaluate the impact on the UL or DL power levels. By evaluating the impact, the UE determines if the first or second antenna is the better option for pilot transmission and also how to balance the power levels between the antennas.

Figure 1:
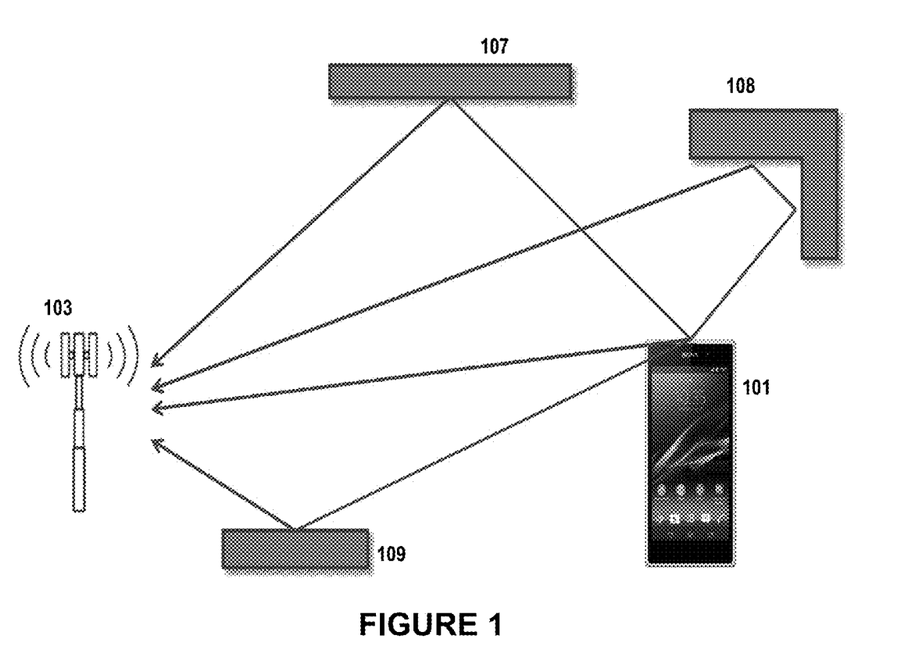
FIG. 1 illustrates an exemplary system environment, in accordance with one embodiment of the present invention.

Referring now to FIG. 1, FIG. 1 presents an exemplary massive MIMO network. In massive MIMO, the device 101 sends out a pilot (or pilot signal) approximately every millisecond that is received at the base station 103. The pilot may be sent out from one or more antennas. In some instances, a first antenna sends a first pilot, a second antenna sends a second pilot, etc. In some instances, the pilot signals transmitted from the device 101 may reflect off of a reflector 107, 108, or 109 prior to being received at the base station 103. As used herein, a pilot signal may also be referred to as just a signal or a signal path.

Figure 2:
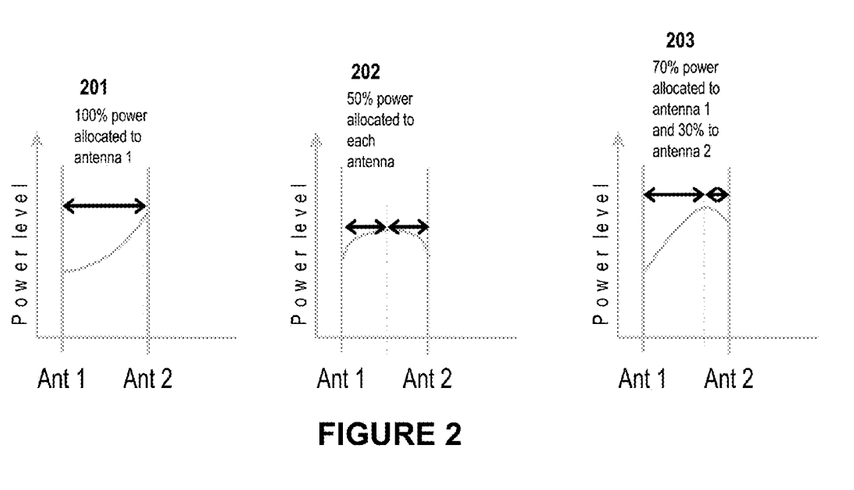
FIG. 2 illustrates exemplary graphs, in accordance with embodiments of the present invention.

Referring now to FIG. 2, FIG. 2 presents three graphs 201, 202, and 203. In graph 201, 100% of the power is allocated to the first antenna. In graph 202, 50% of the power is allocated to the first antenna, and 50% of the power is allocated to the second antenna. In graph 203, 70% of the power is allocated to the first antenna, and 30% of the power is allocated to the second antenna. Each of the graphs indicates the power level for UL (i.e., the channel loss). The concept of weighting the antenna power levels for pilot transmission can also be used by the BS in a closed loop where the individual antennas of the UE transmit separate pilots occasionally, and the BS determines how to weight the antenna channels when the same pilot is transmitted by two or more antennas. A closed loop is where one or more feedback loops are present between the output (e.g., the BS or UE) and input (e.g., the UE or BS) of the system.

In some embodiments, the present invention obtains optimum phase offset and amplitude balance for continuous transmission between the UE and the BS by optimizing a wireless channel to configure pilot signal transmission in a massive MIMO system. This optimization is achieved in a closed loop mode. In some embodiments, a BS knows that the UE is a multiple antenna device. The channel estimation procedure comprises two steps. The BS instructs the UE to transmit individual pilot signals from two or more different antennas of the UE on separate channels of the UE (different time slots or at different frequencies). Then the BS is able to estimate the wireless channel for each of the different antennas. The BS uses information associated with the estimated channel to define the parameters of a filter (referred to as a filter matching process) and sends these parameters back to the UE. In embodiments where the UE estimates the channel, the BS shares the channel state information ("CSI") with the UE which uses the CSI to estimate the channel. The UE programs the filter (amplitude balance or ratio, phase offset or delay) to be used for continuous transmission in both UL and DL both during the pilot transmission and data part of a data frame transmission. As used herein, transmission refers to transmission between the UE and BS. As the programming or optimization of the filter is a slow process, the present invention is directed to implementing the channel estimation procedure at a predetermined rate, e.g., once per second. In between separate channel estimation procedures, the same pilot signal is transmitted on all or a plurality of UE antennas with the amplitude ratio and phase offset of the antennas being based on information determined during the channel estimation.

Figure 3:
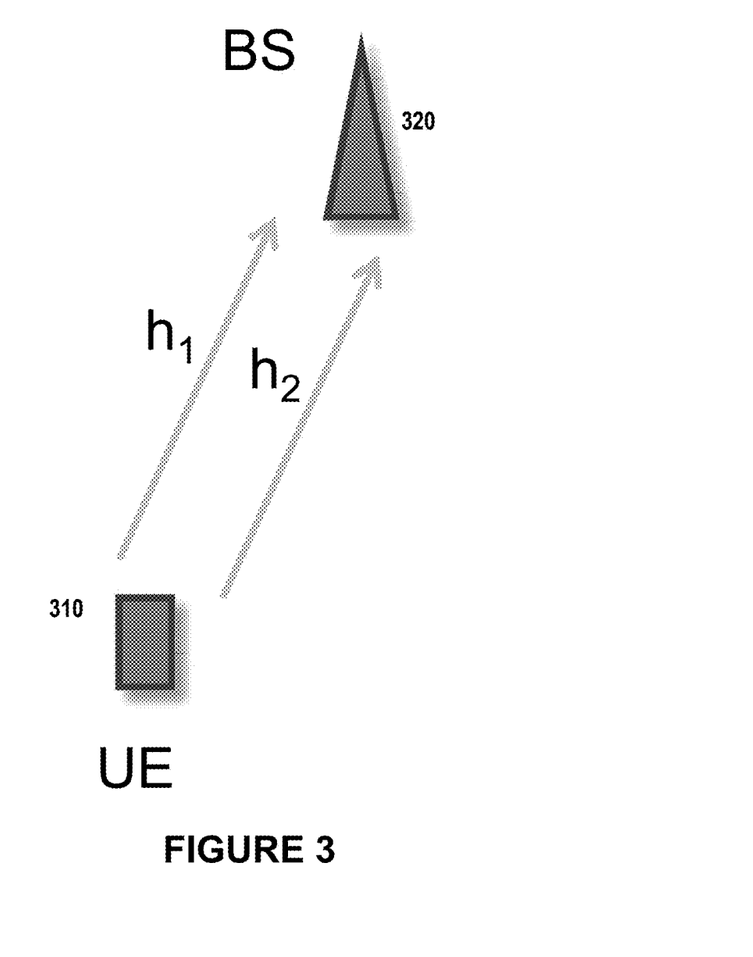
FIG. 3 illustrates an exemplary system interaction, in accordance with one embodiment of the present invention.

Referring now to FIG. 3, FIG. 3 presents a UE 310 communicating with a BS 320. FIG. 3 also presents two channels ($h_1$ and $h_2$) that enable transmission between the UE 310 and the BS 320. There is a relation between the signals at the antenna feed according to Equation 1:

$$y_1 = k y_2 e^{j\varphi} \quad \text{(Equation 1)}$$

In Equation 1, y is the output signal at each antenna in a two antenna scenario, k is the amplitude balance or ratio, and φ is the phase offset. The channel ($h_1$ and $h_2$) is the same for UL and DL, but dependent on an individual antenna's gain. As the antennas are close to each other on a UE, the angle of arrival ("AoA") for different multipath components (i.e., echoes) of a pilot signal will be about the same for both antennas.

By estimating the individual channels for each antenna by separate pilot signals, the optimum amplitude balance (a) and phase offset (φ) for highest combined channel capacity can be calculated. During transmission, the antenna signals can be combined and split according to the equations:

$$\sqrt{\alpha}\, y_1 + \sqrt{1-\alpha}\, y_2 e^{-j\varphi} \quad \text{(Equation 2)}$$

$$k = \sqrt{\frac{1}{\alpha} - 1} \quad \text{(Equation 3)}$$

Figure 4:
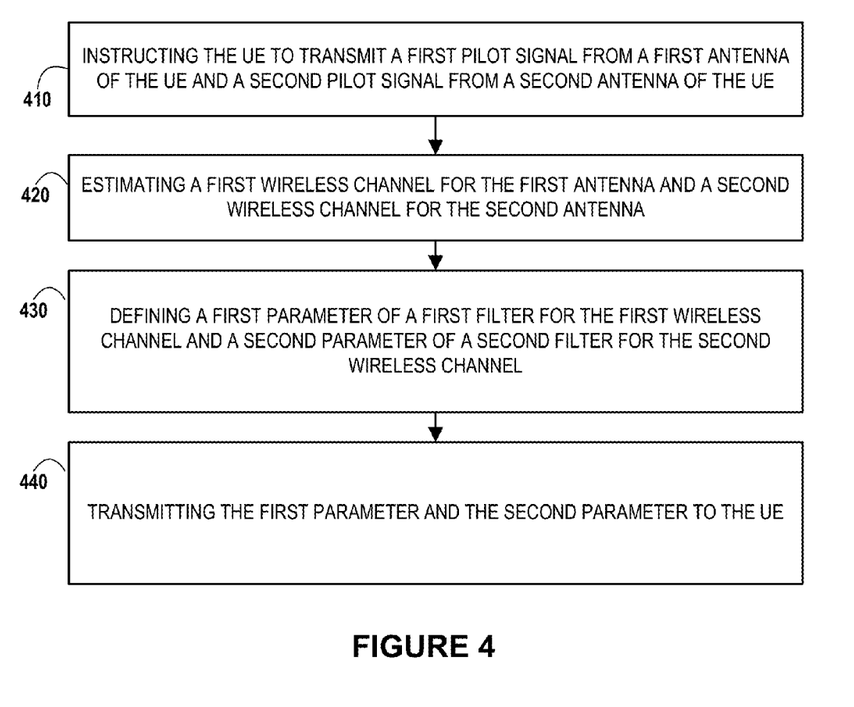
FIG. 4 illustrates an exemplary method, in accordance with one embodiment of the present invention.

Referring now to FIG. 4, FIG. 4 presents an exemplary method optimizing a wireless channel between a user equipment and a base station. At block 410, the method comprises instructing the UE to transmit a first pilot signal from a first antenna of the UE and a second pilot signal from a second antenna of the UE. At block 420, the method comprises estimating a first wireless channel for the first antenna and a second wireless channel for the second antenna. At block 430, the method comprises defining a first parameter of a first filter for the first wireless channel and a second parameter of a second filter for the second wireless channel. At block 440, the method comprises transmitting the first parameter and the second parameter to the UE.

In some embodiments, the first parameter or the second parameter comprises at least one of an amplitude balance or a phase offset associated with the first antenna and the second antenna. In some embodiments, the first wireless channel or the second wireless channel is estimated at a predetermined rate. In some embodiments, an output signal at the first antenna or the second antenna is based on an amplitude balance and a phase offset associated with the first antenna and the second antenna. In some embodiments, the first wireless channel or the second wireless channel is used for both uplink or downlink transmission. In some embodiments, a first angle of arrival for multipath components of the first pilot signal is substantially equal to a second AoA for multipath components of the second pilot signal. In some embodiments, the BS shares channel state information associated with at least one of the first wireless channel or the second wireless channel with the UE such that the UE probes at least one of the first antenna or the second antenna at a time chosen by the UE.

In some embodiments, another method is provided for optimizing a wireless channel between a user equipment and a base station. The method comprises instructing the UE to transmit a first pilot signal from a first antenna of the UE and a second pilot signal from a second antenna of the UE; and transmitting, to the UE, first channel state information for a first wireless channel associated with the first antenna and second CSI information for a second wireless channel associated with the second antenna, wherein the UE uses the first CSI to estimate the first wireless channel and the second CSI to estimate the second wireless channel. In some embodiments, the UE uses at least one of the first CSI or the second CSI to determine at least one of the amplitude balance or the phase offset associated with the first antenna and the second antenna.

The invention is not limited to any particular types of devices for the UE and/or BS. Examples of devices include mobile phones or other mobile computing devices, mobile televisions, laptop computers, smart screens, tablet computers or tablets, portable desktop computers, e-readers, scanners, portable media devices, gaming devices, cameras or other image-capturing devices, headgear, eyewear, watches, bands (e.g., wristbands) or other wearable devices, or other portable computing or non-computing devices.

Each UE and/or BS comprises a communication interface, a processor, a memory, and a module stored in the memory, executable by the processor, and configured to perform the various processes described herein. Each communication interface described herein enables communication with other systems. For example, the communication interface comprises at least one antenna.

Each processor described herein generally includes circuitry for implementing audio, visual, and/or logic functions. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory.

Each memory may include any computer-readable medium. For example, memory may include volatile memory, such as volatile random access memory ("RAM") having a cache area for the temporary storage of data. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

The various features described with respect to any embodiments described herein are applicable to any of the other embodiments described herein. As used herein, the terms data and information may be used interchangeably. Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory ("RAM"), a read-only memory ("ROM"), an erasable programmable read-only memory ("EPROM" or "Flash memory"), a compact disc read-only memory ("CD-ROM"), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable information processing apparatus in order to produce a particular machine, such that the one or more computer-executable program code portions, which execute via the processor of the computer and/or other programmable information processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable information processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable information processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method for optimizing a wireless channel between a user equipment ("UE") and a base station ("BS") in a (Multiple Input, Multiple Output) MIMO or (Massive MIMO) MaMIMO network, the method comprising:

communicating, by the BS, instructions to the UE, wherein the instructions instruct the UE to transmit, on one of different time slots or different frequencies, a first pilot signal from a first antenna of the UE and a second pilot signal from a second antenna of the UE;

in response to receiving the first and second pilot signals from the UE, estimating, at the BS at a predetermined rate, a first wireless channel for the first antenna based on the first pilot signal and a second wireless channel for the second antenna based on the second pilot signal;

defining, at the BS, a first parameter of a first filter for the first wireless channel and a second parameter of a second filter for the second wireless channel; and transmitting, from the BS, the first parameter and the second parameter to the UE, wherein the UE uses the first parameter and the second parameter to program a matched filter used for continuous transmission in an uplink and a downlink during pilot transmission and a data part of a data frame transmission, wherein the matched filter defines an amplitude ratio and phase offset for the first and second antenna, wherein during a predetermined interval corresponding to the predetermined rate, the UE transmits a pilot signal on all antennas with the amplitude ratio and phase offset of all of the antennas being based on information determined during a last-in-time channel estimation, and wherein the pilot signal transmitted on all antennas is the same.

2. The method of claim 1, wherein the first parameter or the second parameter comprises at least one of an amplitude ratio or a phase offset associated with the first antenna and the second antenna.

3. The method of claim 1, wherein an output signal at the first antenna or the second antenna is based on an amplitude ratio and a phase offset associated with the first antenna and the second antenna.

4. The method of claim 1, wherein the first wireless channel or the second wireless channel is used for both uplink ("UL") or downlink ("DL") transmission.

5. The method of claim 1, wherein a first angle of arrival ("AoA") for multipath components of the first pilot signal is substantially equal to a second AoA for multipath components of the second pilot signal.

6. The method of claim 1, wherein the UE probes at least one of the first antenna or the second antenna at a time chosen by the UE.

7. An apparatus for optimizing a wireless channel between a user equipment ("UE") and a base station ("BS") in a (Multiple Input, Multiple Output) MIMO or (Massive MIMO) MaMIMO network, the apparatus comprising:

a memory;

a processor; and a module stored in the memory, executable by the processor, and configured for:

communicating, by the BS, instructions to the UE, wherein the instructions instruct the UE to transmit, on one of different time slots or different frequencies, a first pilot signal from a first antenna of the UE and a second pilot signal from a second antenna of the UE;

in response to receiving the first and second pilot signals from the UE, estimating, at the BS at a predetermined rate, a first wireless channel for the first antenna based on the first pilot signal and a second wireless channel for the second antenna based on the second pilot signal;

defining, at the BS, a first parameter of a first filter for the first wireless channel and a second parameter of a second filter for the second wireless channel; and transmitting, from the BS, the first parameter and the second parameter to the UE, wherein the UE uses the first parameter and the second parameter to program a matched filter used for continuous transmission in an uplink and a downlink during pilot transmission and a data part of a data frame transmission, wherein the matched filter defines an amplitude ratio and phase offset for the first and second antenna, wherein during a predetermined interval corresponding to the predetermined rate, the UE transmits a pilot signal on all antennas with the amplitude ratio and phase offset of all of the antennas being based on information determined during a last-in-time channel estimation and wherein the pilot signal transmitted on all antennas is the same.

8. The apparatus of claim 7, wherein the first parameter or the second parameter comprises at least one of an amplitude ratio or a phase offset associated with the first antenna and the second antenna.

9. The apparatus of claim 7, wherein an output signal at the first antenna or the second antenna is based on an amplitude ratio and a phase offset associated with the first antenna and the second antenna.

10. The apparatus of claim 7, wherein the first wireless channel or the second wireless channel is used for both uplink ("UL") or downlink ("DL") transmission.

11. The apparatus of claim 7, wherein a first angle of arrival ("AoA") for multipath components of the first pilot signal is substantially equal to a second AoA for multipath components of the second pilot signal.

12. A method for optimizing a wireless channel between a user equipment ("UE") and a base station ("BS"), the method comprising:

communicating, by the BS, instructions to the UE, wherein the instructions instruct the UE to transmit, on one of different time slots or different frequencies, a first pilot signal from a first antenna of the UE and a second pilot signal from a second antenna of the UE; and transmitting, to the UE, first channel state information ("CSI") for a first wireless channel associated with the first antenna and second CSI information for a second wireless channel associated with the second antenna, wherein the UE (1) uses the first CSI to estimate, at a predetermined rate, the first wireless channel and the second CSI to estimate the second wireless channel, (2) define a first parameter of a first filter for the first wireless channel and a second parameter of a second filter for the second wireless channel, and (3) uses the first parameter and the second parameter to program a matched filter used for continuous transmission in an uplink and a downlink during pilot transmission and a data part of a data frame transmission, wherein the matched filter defines an amplitude ratio and phase offset for the first and second antenna, wherein during a predetermined interval corresponding to the predetermined rate, the UE transmits a pilot signal on all antennas with the amplitude ratio and phase offset of all of the antennas being based on information determined during a last-in-time channel estimation and wherein the pilot signal transmitted on all antennas is the same.

13. The method of claim 12, wherein the UE uses at least one of the first CSI or the second CSI to determine at least one of the amplitude ratio or the phase offset associated with the first antenna and the second antenna.

14. The method of claim 12, wherein an output signal at the first antenna or the second antenna is based on an amplitude ratio and a phase offset associated with the first antenna and the second antenna.

15. The method of claim 12, wherein the first wireless channel or the second wireless channel is used for both uplink ("UL") or downlink ("DL") transmission.

16. The method of claim 12, wherein a first angle of arrival ("AoA") for multipath components of the first pilot signal is substantially equal to a second AoA for multipath components of the second pilot signal.

17. The method of claim 12, wherein the UE probes at least one of the first antenna or the second antenna at a time chosen by the UE.

* * * * *